No. 701,624. Patented June 3, 1902.
C. E. SANDSTROM.
MACHINE FOR FORMING ELLIPTICAL FRAMES.
(Application filed Feb. 17, 1899.)
(No Model.) 5 Sheets—Sheet 1.
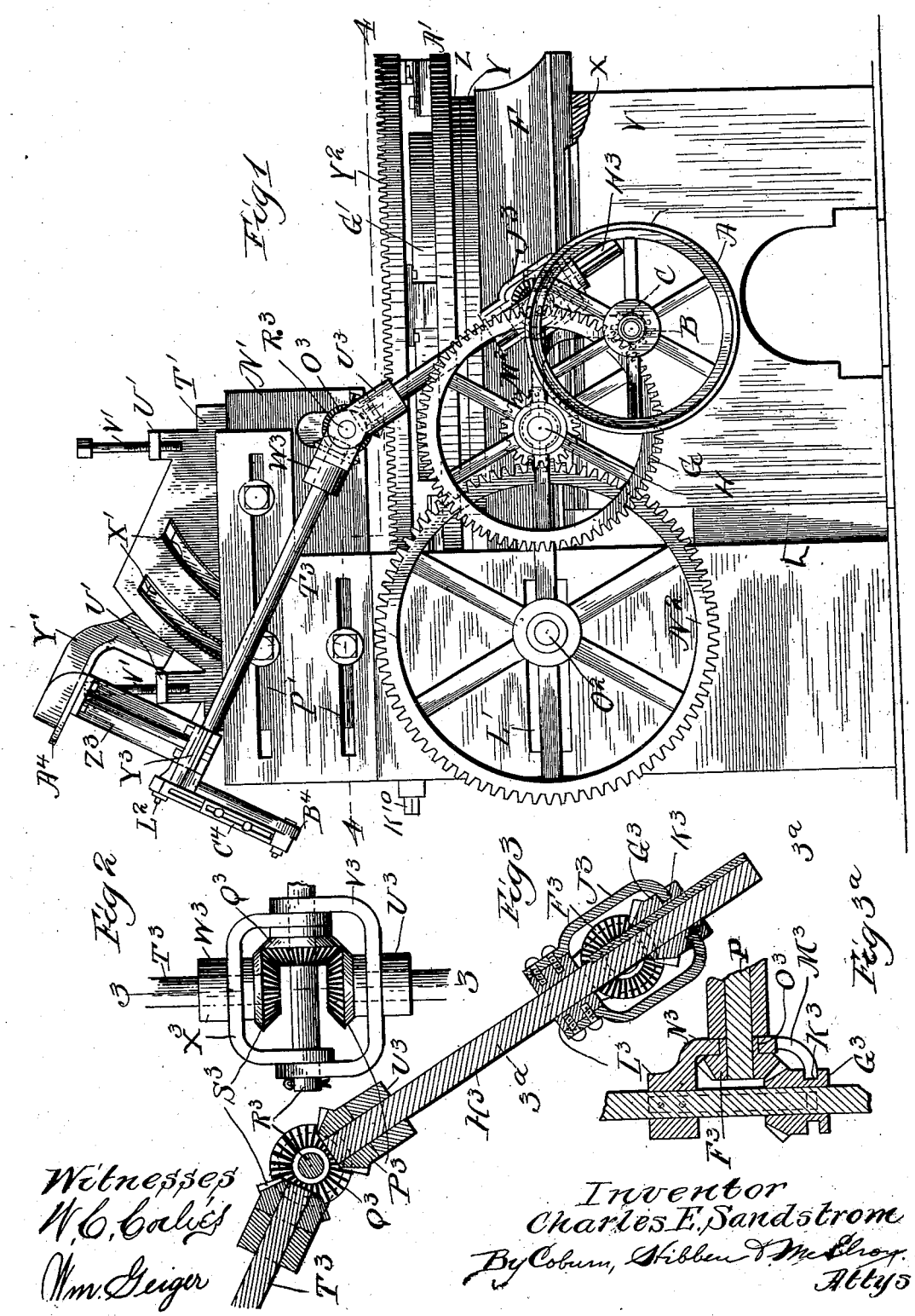
Witnesses
W. C. Cates
Wm. Geiger
Inventor
Charles E. Sandstrom
By Coburn, Hibben & McElroy
Attys

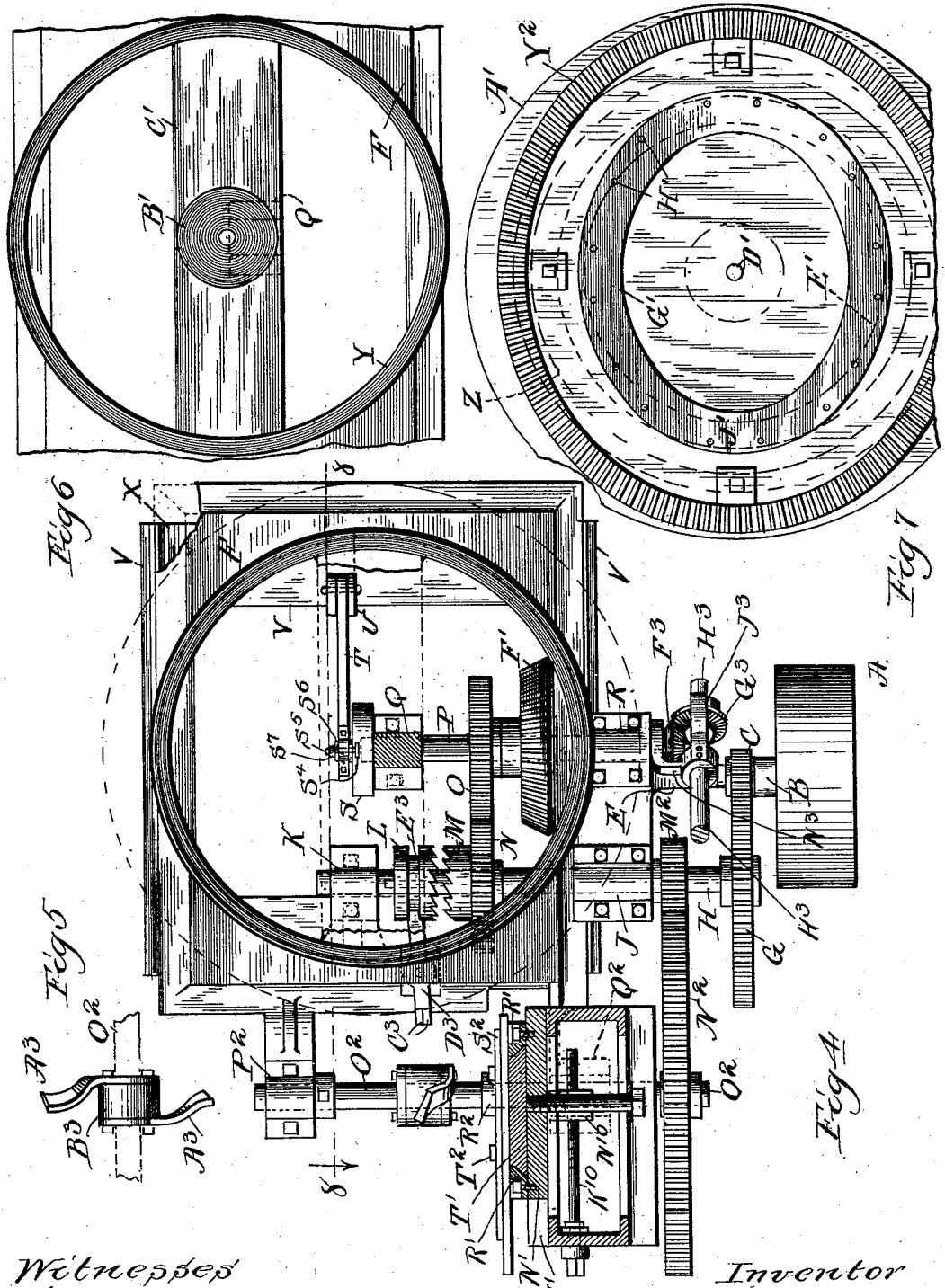

No. 701,624. Patented June 3, 1902.
C. E. SANDSTROM.
MACHINE FOR FORMING ELLIPTICAL FRAMES.
(Application filed Feb. 17, 1899.)
(No Model.) 5 Sheets—Sheet 3.
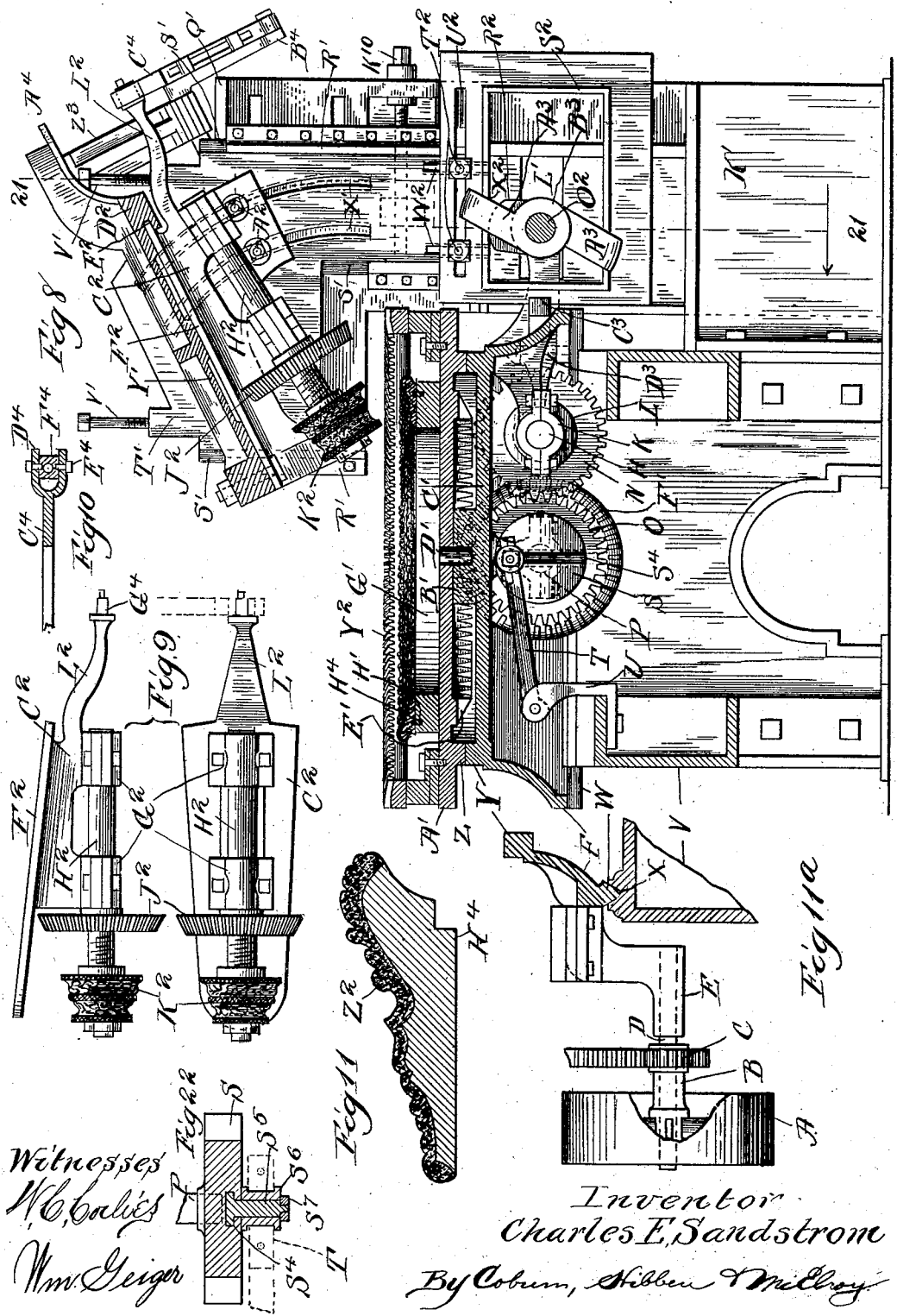
Witnesses
Inventor
Charles E. Sandstrom
By Coburn, Hibben & McElroy
Attys No. 701,624. Patented June 3, 1902.
C. E. SANDSTROM.
MACHINE FOR FORMING ELLIPTICAL FRAMES.
(Application filed Feb. 17, 1899.)
(No Model.) 5 Sheets—Sheet 4.
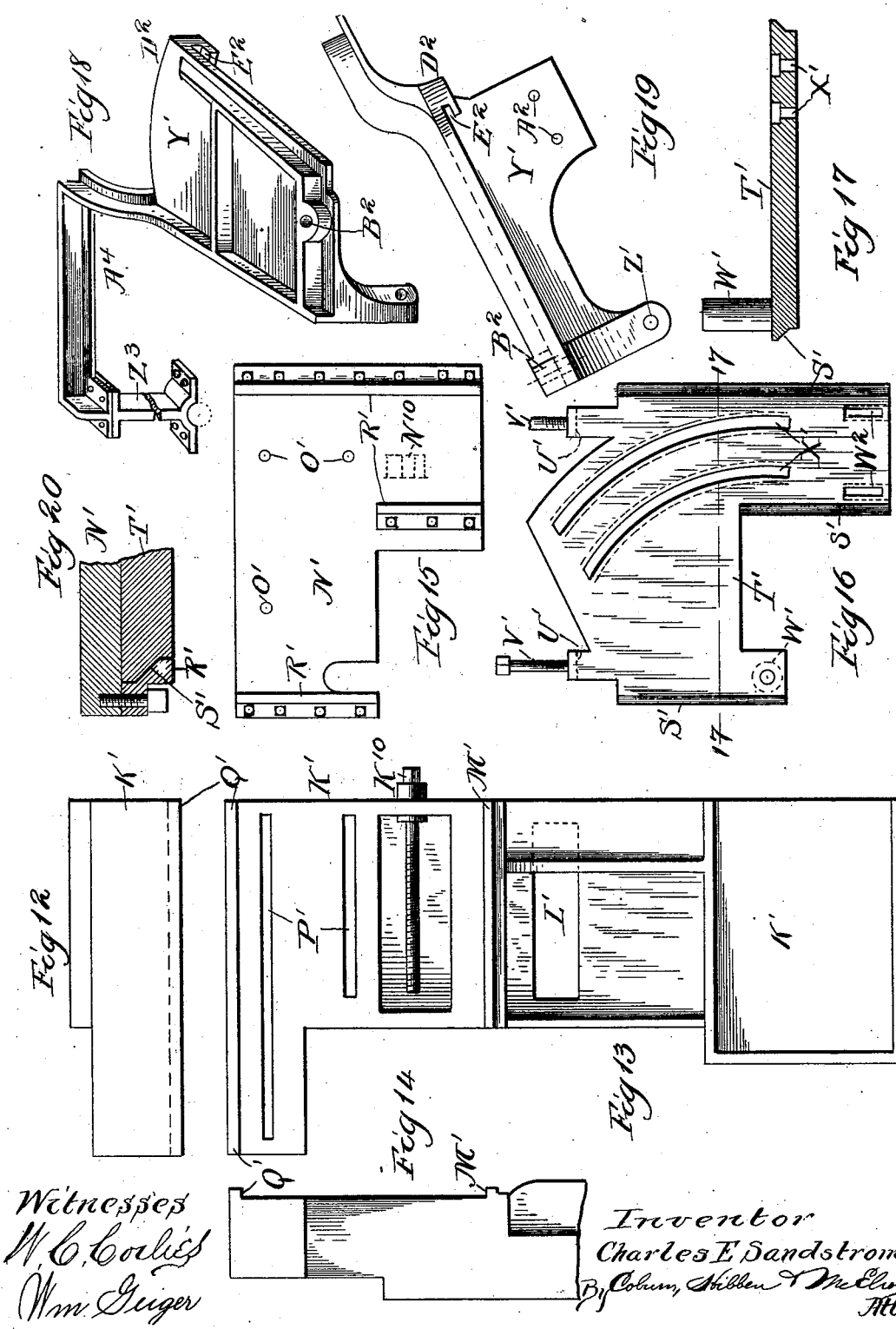

No. 701,624. Patented June 3, 1902.
C. E. SANDSTROM.
MACHINE FOR FORMING ELLIPTICAL FRAMES.
(Application filed Feb. 17, 1899.)
(No Model.) 5 Sheets—Sheet 5.
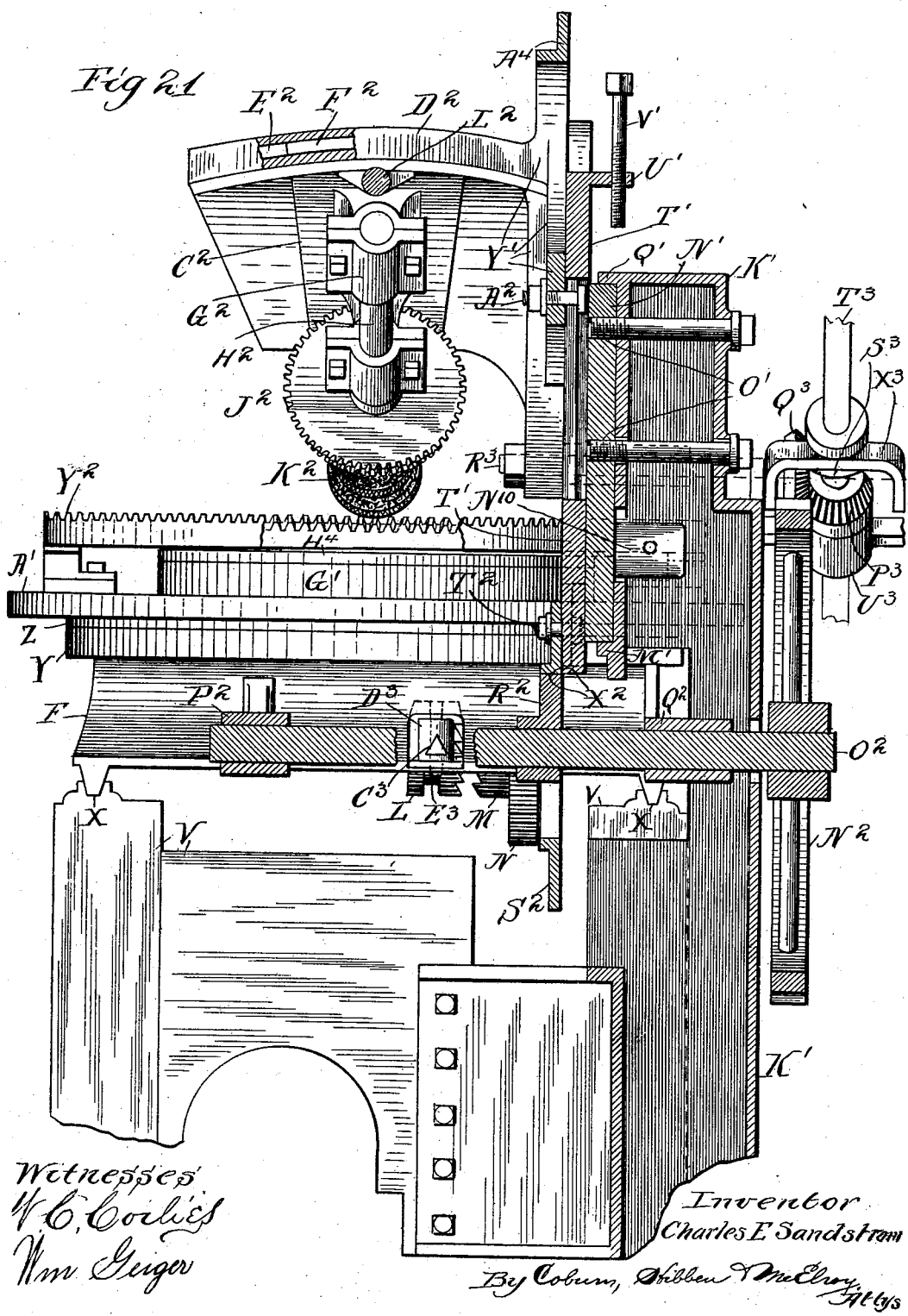
Witnesses
W. C. Coilies
Wm Geiger
Inventor
Charles E Sandstrom
By Coburn, Stibben & McElroy
Attys

UNITED STATES PATENT OFFICE.

CHARLES E. SANDSTROM, OF CHICAGO, ILLINOIS.

MACHINE FOR FORMING ELLIPTICAL FRAMES.

SPECIFICATION forming part of Letters Patent No. 701,624, dated June 3, 1902.

Application filed February 17, 1899. Serial No. 705,806. (No model.)

*To all whom it may concern:*

Be it known that I, CHARLES E. SANDSTROM, residing at Chicago, in the county of Cook and State of Illinois, have invented certain new and useful Improvements in Machines for Forming Elliptical Frames, of which the following is a specification.

My invention relates to a machine employed in carrying out one step in my new process for manufacturing elliptical picture-frames. In my application, Serial No. 703,870, filed January 30, 1899, I have shown a machine for sawing and boring pieces from which the frame is formed, and in another application, Serial No. 26,347, filed August 9, 1900, I have shown a machine for cutting out the design in cross-section of the elliptical frame composed of the several pieces. In the present application, while I have shown a machine constructed specifically for forming a design in putty upon the surface of the elliptical frame cut out by the machine of the aforesaid application, Serial No. 26,347, it will be understood that I might use it for impressing a design upon some other material—such as soft wood, metal, or any other material that can be molded—or by the substitution of a cutter for the mandrel or ornamental roller and running it at a higher rate of speed I might cut out a molding design upon the upper surface of the frame, thus causing this particular machine to perform the function of the one shown in the aforesaid application, Serial No. 26,347, or I might use it for applying some other material in a uniform layer upon the surface of the elliptical frame instead of forming the design.

My invention, furthermore, relates to a mechanism for rotating an elliptical frame or surface thereon and at the same time reciprocating it so that a substantially stationary former will be properly applied to said frame or surface despite its elliptical shape.

My invention further relates to mechanism for vibrating a mandrel or former operating upon an elliptical frame passing beneath it, so that the position of the axis of the former shall vary automatically to conform to the varying centers of curvature of the ellipse passing beneath it.

My invention further relates to other combinations of mechanism, as fully set out in the annexed claims.

Referring to the accompanying sheets of drawings annexed hereto to illustrate the invention, and in which the same letters of reference are used to designate identical parts in all the figures, Figure 1 is a side elevation of the complete machine. Fig. 2 is a plan view of a power-transmitting joint. Fig. 3 is a sectional view through the said joint and a portion of the shafting. Fig. 3ª is a section of the mechanism on the line 3ª 3ª of Fig 3. Fig. 4 is a plan view of the machine in section on the line 4 4 of Fig. 1 with the supporting-frame removed. Fig. 5 is an elevation of a pair of cams for operating the clutch mechanism. Fig. 6 is a plan view of a portion of the reciprocating bed-plate shown in Fig. 4, but with the parts complete and not broken away as they are in Fig. 4. Fig. 7 is a plan view of the rotating and reciprocating work-carrying plate. Fig. 8 is a sectional view through the machine on the line 8 8 of Fig. 4. Fig. 9 is a side elevation and inverted plan view of the former or mandrel and the bearings and frame therefor in which it is mounted. Fig. 10 is a detail showing the connections between the frame for the mandrel and the link which vibrates said frame. Fig. 11 is a cross-section through the frame after the putty is applied. Fig. 11ª is a side elevation showing the mounting for the belt-wheel upon the horizontally - reciprocating frame. Figs. 12, 13, and 14 are a plan view, side elevation, and front elevation, respectively, of the stationary portion of the main vertical frame. Fig. 15 is a side elevation of a supplemental frame adjustable upon the main vertical frame and forming ways for the vertically - reciprocating plate carrying the mandrel. Fig. 16 is a side elevation of the vertically - reciprocating plate. Fig. 17 is a cross-section of the same on the line 17 17 of Fig. 16. Fig. 18 is a perspective view of the support for the bearing-frame for the mandrel, which support is angularly adjustable in the arc of a circle upon the vertically-reciprocating plate of Fig. 16. Fig. 19 is a side elevation of the support shown in Fig. 18. Fig. 20 is a detail in section, on an enlarged scale, showing the relation of the vertically-sliding plate of Fig. 16 to the ways of Fig. 15 in which it is mounted. Fig. 21 is a rear elevation, on an enlarged scale, of the machine in section on the line 21 21 of Fig. 8; and Fig. 22 is a detail in section.

The power is applied to the belt-pulley A, Figs. 1 and 4, which may have a sleeve B, connecting it rigidly with the gear-pinion C. This belt-pulley and gear-pinion are mounted upon the axle or stub-shaft D, which may be formed integral with or supported by the bracket E, shaped as shown in Fig. 11ª and cast with or otherwise rigidly connected to the side of the horizontally-sliding frame F. The gear-pinion C meshes with a gear-wheel G, mounted upon and rigidly secured to the shaft H, which is rotatably mounted in the bearings J and K, carried by the aforesaid horizontally-sliding frame F. This shaft H has splined thereon a clutch member L, which is reciprocated by means to be subsequently described. This reciprocating clutch member L coöperates with the clutch member M, rotatably mounted upon the shaft and rigidly connected to the gear-wheel N, which meshes with the gear-wheel O, rigidly mounted upon the shaft P, which in turn is supported by the bearings Q and R, also secured to the horizontally-reciprocating frame F. This shaft P has secured on its inner end a disk S, having the T-shaped groove $S^4$ across its face. A bolt $S^5$ has its head in the groove, and the collar $S^6$ and the nut $S^7$ serve to secure the bolt in any desired eccentric position. Upon the collar $S^6$ is mounted a link T, the other end of which is pivotally secured in the ears of the support U, which, as seen in Fig. 8, may be secured to a horizontal cross-piece of the substantially rectangular portion V of the framework of the machine. The horizontally-reciprocating frame F, which is substantially rectangular, has the bottoms of its sides forming bearing-surfaces W, which slide in the substantially V-shaped ways X, formed upon the upper surface of the stationary frame V, as shown in Fig. 4. It will be readily seen that as power is applied to the belt-pulley A and transmitted to the shaft P the link T, being pivotally mounted upon the stationary framework and eccentrically mounted upon the shaft P, will by the rotation of the shaft P cause the frame F to be vibrated horizontally upon the ways X. As the bolt $S^5$ can be secured at any desired position in the slot or groove $S^4$, I am enabled thereby to vary the movement of the frame F, as may be desired, and thus vary the relative lengths of the major and minor axes of the ellipse described, as hereinafter set out.

The horizontally-reciprocating frame F has formed on its upper surface the annular bearing-surface Y, which coöperates with a corresponding annular bearing-surface Z, formed on the under side of the rotating and reciprocating plate A'. (Shown in Fig. 7.) The frame F may also have the central circular bearing portion B', which may be supported by the cross-piece C', upon the under side of which the bearing Q for the shaft P may also be supported. The under side of the central portion of the plate A' coöperates with the bearing-surface B', and the king-pin D', passing through the center of the plate A' and the bearing B', serves to hold the reciprocating plate F and the revolving plate A' in their proper relation. Rigidly secured to or formed on the under surface of the rotating plate A' and best shown in Fig. 8 is an annular bevel-gear E', which meshes with a bevel-gear F', rigidly secured upon the shaft P. It results from this construction that as the shaft P rotates it forces the horizontal reciprocation of the plate F, and consequently of the plate A', which latter plate is at the same time rotated by means of the coöperation of the bevel-gears E' and F'. The plate A' has placed concentrically thereon the raised elliptical bearing-surface G', upon which is placed the elliptical frame described in my aforesaid application Serial No. 703,870, the pins H' being placed upon said bearing-surface to coöperate with the holes bored on the under side of the elliptical frame, thus securing rapid and accurate registration of the parts. It will be seen that the mechanism hitherto described can be and is so constructed and timed that taking a stationary point, as at J' in Fig. 7, the reciprocation and rotation of the plate A' will cause the outer surface of the elliptical frame to pass directly beneath said point.

Rigidly secured to or in relation to the rectangular stationary portion V of the framework is the vertical portion K'. (Shown in detached views in Figs. 12, 13, and 14.) This vertical portion of the framework is formed with a horizontal aperture L' therein to permit the passage and reciprocation of the shaft to be subsequently mentioned. It has formed thereon the horizontal shoulder M', upon which rests the horizontally-adjustable bearing-plate N', which can be secured in any desired horizontal position by means of bolts passed through the horizontal slots P' in the vertical portion K' of the framework and screwed into the holes O' in the plate N'. An overhanging shoulder Q' at the top of the vertical portion K' of the framework may coöperate with the upper side of the horizontally-adjustable bearing-plate N'. To conveniently provide for the horizontal movement of the plate N' relative to the vertical framework K', I may provide the screw-bolt $K^{10}$, mounted to turn in the framework K' and having the screw-threaded portion, which coöperates with a screw-threaded lug $N^{10}$ (shown in Fig. 21) and projecting rearwardly from the plate N'. This bearing-plate N' has the strips R' of the cross-section shown in Fig. 20 bolted thereon to form ways, with which the edges S' of the vertically-reciprocating plate T' coöperate, as shown in the detail sketch of Fig. 20. The vertically-reciprocating plate T' is of the general shape shown in Fig. 16 and has the rearwardly-projecting lugs U' at its top portion, as shown in Fig. 21, through which may be passed the set-screws or bolts V', which serve to limit the downward movement of the plate, they coöperating with the upper surface of the portion K' of the framework, as clearly shown in Fig. 21. The plate T' has also connected thereto the rearwardly-projecting circular bearing W' and has formed therein the segmental slots X', which are formed concentric with the bearing W'. This bearing W' and the slots X' are employed to secure the angular adjustment of the support Y', the general shape of which is illustrated in Figs. 18 and 19 and which has the holes Z' and $A^2$, through which pass bolts coöperating, respectively, with the bearing W' and the slots X' to secure the support in any desired position of angular adjustment. This support Y' also has formed therein the vertical bearing-hole $B^2$, through which passes a bolt forming the axis or pivotal center of the mandrel-bearing frame $C^2$. (Shown in detail in Fig. 9.) The under side of the support Y' has formed thereon the shoulder $D^2$, in which is formed the segmental groove $E^2$, in which slides the rear end of the plate $F^2$, forming the main portion of the mandrel-bearing frame $C^2$. This mandrel-bearing frame $C^2$ has the bearings $G^2$, in which is mounted the shaft $H^2$, upon which is secured the bevel gear-pinion $J^2$ and the mandrel or former $K^2$, which has the reverse of the design formed on the circular periphery thereof. Inasmuch as the mandrel-bearing frame $C^2$ is pivotally mounted at $B^2$, which is practically over the mandrel, it will be readily seen that it may be swung about this point as a pivot to vary the angular relation of the axis of the mandrel or former to the line passing through any center of curvature of the elliptical frame and at right angles thereto. This mandrel-bearing frame is furnished with the arm $L^2$, to which movement is applied by mechanism to be subsequently described.

Rigidly secured upon the shaft H is a gear-pinion $M^2$, which meshes with a gear-wheel $N^2$, rigidly secured upon the shaft $O^2$, which is rotatably mounted in the bearings $P^2$ and $Q^2$, projecting rearwardly from the end of the horizontally-reciprocating frame F. This shaft $O^2$ rotates and also reciprocates backward and forward through the aperture L' in the vertical portion K' of the framework and carries a cam-lug $R^2$, which coöperates with a cam-frame $S^2$, which may be rectangular, as shown, and which may be adjustably secured horizontally and vertically by bolts $T^2$, passing through the elongated horizontal slot $U^2$ in the upper side thereof and into the vertical slots $W^2$, formed in the lower end of the vertically-reciprocating plate T'. As the shaft $O^2$ rotates it will be seen that the cam-lug $R^2$, coöperating with the bearing-surface $X^2$, formed in the frame $S^2$, will raise the vertically-reciprocating frame T', which slides in the ways R' on the frame N', and thus the mandrel or former and its connected parts is raised and held raised during a portion of the rotation of the shaft $O^2$. While the mandrel is thus raised it is out of contact with the work and its bevel-pinion $J^2$ is raised out of mesh with the elliptical bevel-gear $Y^2$, which is secured upon the upper surface of the frame A' concentric with and parallel to the elliptical support G'. When the frame and mandrel are lowered, as they will be during a greater portion of the revolution of the shaft $O^2$, the bevel-pinion $J^2$, meshing with the bevel-pinion $Y^2$, will cause the mandrel to rotate with just sufficient speed to roll over the surface of the elliptical frame placed upon the elliptical bearing-surface G' and to form its design thereon in the putty $Z^2$, which is fed or placed on the frame in advance of its passing underneath the mandrel. The employment of the bevel-pinion $J^2$ insures the positive movement of the mandrel and also the exact meeting of the ends when rotation is completed. Also rigidly secured upon the shaft $O^2$ is a pair of cam-arms $A^3$, which may be bolted to a collar $B^3$, which is secured upon the shaft. These cam-arms $A^3$ coöperate with the oppositely-beveled surfaces $C^3$ of the outer end of the lever $D^3$, which is pivotally mounted upon the end of the horizontally-reciprocating frame F and has its other end engaging the customary groove $E^3$, formed in the constantly-rotating and sliding clutch member L. The action of these parts will be as follows: As the shaft $O^2$ is rotated very slowly by reason of being geared down from the belt-wheel A, supposing the clutch member L is in the position shown in Fig. 4, the sliding frame F and the plate A' will be at rest, and during this interval of rest the frame which has been operated on may be taken off and quickly replaced by another frame. As soon as the arm $A^3$, which is uppermost in Fig. 4, has reached the coöperating surface $C^3$ of the lever $D^3$ the lever is shifted and the clutch is engaged, which sets the shaft P in motion, and the frame F is reciprocated and the plate A' is reciprocated and rotated. Supposing the plate A' is arranged in the same position as shown in Fig. 7 at the time its rotation begins, the reciprocation of the plate will be such as to bring the plate to the left just rapidly enough to keep the bevel-gear pinion $J^2$ in mesh with the rack $Y^2$ and the mandrel or former $K^2$ just over the surface of the frame being operated upon. When the frame A' has made a quarter of a turn, the movement of the frame to the left is completed, and it begins to move to the right at such a rate of speed as to keep the gears in mesh and the mandrel properly located relative to the frame, the limit of the movement to the right being reached when the frame A' has revolved through another quarter of a circle. During the second half of the rotation of the frame A' it is similarly advanced to the left and returned. The gearing is so proportioned as to give the frame A' slightly more than one complete rotation, when the other arm $A^3$ engages the other side of the lever $D^3$ and shifts the clutch out of engagement. It will be understood that before the clutch is shifted to start the rotation of the plate $A'$ the mandrel is lowered by means of a supporting-cam lug $R^2$ being turned so as to permit gravity to carry the mandrel down and the bevel-pinion $J^2$ into engagement with the rack $Y^2$, and it will also be understood that after the rotation of the frame $Y^2$ has ceased the action of the cam-lug $R^2$ serves to raise the mandrel, so as to permit of the removal of the frame and the insertion of a fresh one. Owing to the fact that the frame to be operated upon is of an elliptical shape, it will be seen that if the axis of the mandrel were, say, at right angles to the shafts P, H, and $O^2$ a line drawn from the edge of the ellipse through the center of rotation and another from the same point in the edge of the ellipse through the center of curvature at that particular spot would only coincide at four points of the ellipse—i. e., at the ends of the major and minor axes. In order to cause the mandrel or former to operate properly and register exactly upon the surface to be operated upon, its axis must always be in line with a line drawn from the particular spot being operated upon to the center of curvature of that particular portion of the ellipse. Starting with the ellipse in the position shown in Fig. 7 and with the mandrel at the point $J'$, it will be seen that as the ellipse is rotated, say, from the right over to the left, it is necessary to swing the mandrel to one side for a certain distance, culminating at about one-eighth of the rotation, when it is swung back through the next eighth, so that the axis of the mandrel is again at right angles to the shafts P, H, and $O^2$ at the completion of one-quarter of the rotation. During the next quarter of the rotation the mandrel is swung in the other direction a similar distance and returned, so as to again be in its normal position at the end of one-half a rotation of the plate $A'$, and the same action occurs during the third and fourth quarters of a revolution, thus necessitating the swinging of the axis of the mandrel to a certain extent on either side of its normal position twice during the complete rotation of the plate $A'$. To secure this movement, I provide the following mechanism: The outer end of the shaft P outside of the bearing R is furnished with the bevel-pinion $F^3$, which meshes with a corresponding bevel-pinion $G^3$, which is splined to slide upon and rotate the shaft $H^3$. (Best shown in Figs. 1, 2, and 3.) The pinion $G^3$ is supported by the yoke $J^3$, the lower end of which is in the form of a collar taking into the annular groove $K^3$, formed below the teeth of the bevel-pinion $G^3$. The upper end of the yoke $J^3$ is secured to the collar $L^3$, surrounding the shaft $H^3$. The yoke $J^3$, as shown, has three arms, the arms $M^3$ being similar, while the arm $N^3$ differs therefrom in the fact that it is enlarged at its central portion and has an aperture $O^3$, through which the end of the shaft P passes, thereby virtually forming a collar for the bevel-pinion $F^3$. The upper end of the shaft $H^3$ has rigidly secured thereon the bevel gear-pinion $P^3$, which meshes with an idle bevel gear-pinion $Q^3$, mounted upon a stub-shaft $R^3$, which may be conveniently mounted in the bearing $W'$, and thus serves the double function of acting as a pivot for the angular adjustment of the support $Y'$ and of the stub-shaft for the idle pinion $Q^3$. This idle pinion $Q^3$ meshes with a similar bevel-gear $S^3$, which is secured upon the shaft $T^3$. The upper end of the shaft $H^3$ is mounted in the bearing $U^3$, formed in the yoke $V^3$, which is carried by the stub-shaft $R^3$. Similarly the lower end of the shaft $T^3$ is secured in the bearing $W^3$, formed upon the yoke $X^3$, which is similarly pivotally mounted on the stub-shaft $R^3$. The upper end of the shaft $T^3$ is mounted in a bearing $Y^3$, formed upon the lower end of the arm $Z^3$, projecting downwardly from the arm $A^4$ of the support $Y'$. The upper end of the shaft $T^3$ terminates in the crank-arm $B^4$, which has pivotally secured at its outer end the adjustable link $C^4$, the other end of which is pivotally secured to the end of the arm $L^2$ by the mechanism particularly shown in Fig. 10. This adjustable link $C^4$ terminates in the yoke $D^4$, in which is swiveled by the pins $E^4$ a bearing-block $F^4$, having an aperture therein through which the stub-journal $G^4$, terminating the arm $L^2$, passes and upon which it is secured. The operation of this mechanism will be readily apparent. During the time that the shaft P is rotating its movement is transmitted by the system of bevel-gears and the shafts $H^3$ and $T^3$, so that the rotation of the shaft $T^3$ by means of the crank-arm $B^4$ reciprocates the link $C^4$ and causes the mandrel-bearing frame $C^2$ to vibrate upon its axis, thus giving the necessary movement to the mandrel to cause it to occupy the proper position relative to the frame. As explained above, this mechanism must be timed so as to swing the mandrel twice on either side of its normal position during one complete rotation of the plate $A'$. The connections between the shaft P, which moves horizontally by reason of the reciprocation of the frame F and of the stub-shaft $R^3$, which is raised and lowered during each operation of the machine by reason of its being connected to the mandrel-supporting mechanism, are such as to permit of these movements without disengaging the gears. The mounting of the shaft $T^3$ is also such that as the position of the mandrel-bearing frame is shifted the shaft moves with it without disturbing in the least its connections.

The operation of the complete machine will be readily apparent. The connections are such as to permit the machine to be adjusted for any desired angle at which the mandrel $K^2$ is to be applied to the molding $H^4$, which has been previously cut to substantially the contour of the completed frame. The design of the completed molding may be changed by changing the mandrel-wheel, and all the parts may be adjusted to accommodate any change in the size or curve of the ellipse. When the parts are properly adjusted to the frame to be operated upon, the machine is set in motion, and after the rotation of the shaft $O^2$ has moved the cam-lug $R^2$ to such a position as to permit the design of the mandrel to engage the work the clutch is operated to start the rotation of the plate $A'$. As this plate rotates it reciprocates, as explained before, to keep the molding constantly under the mandrel or former, and the angle of the mandrel or former is constantly shifted, so as to keep its axis at right angles to the center of curvature of the point being operated upon. After a complete rotation or slightly more of the plate $A'$ one of the cam-arms $A^3$ disengages the clutch to stop the rotating and reciprocating movement, and shortly after this movement ceases the mandrel and its frame are raised by the action of the cam-lug $R^2$ to permit the withdrawal of the frame which has been puttied and the insertion of a fresh one preparatory to the descent of the mandrel ready for another operation.

While I have designed my invention primarily for use in forming elliptical frames in which the major and minor axes are radically different in length, it will be understood that the principle thereof is capable of being operated upon elliptical frames whose major and minor axes approach each other in length until they are equal, or, in other words, until the ellipse becomes a circle. It will be apparent that if the bolt $S^5$ is adjusted in the center of the groove $S^4$ the ellipse reaches its limit of adjustment in the one direction and becomes a circle. Consequently in the interpretation of the claims I do not desire to be limited to any particular relationship of the axes of the ellipse, but desire to cover all relationships up to and including the limit at which it becomes a circle. In the claims where the ornamental roller or rotating cutter is included as an element I have used as a generic term to designate either of said constructions the term "forming-tool."

While I have shown my invention as embodied in the form which I at present consider best adapted to carry out its objects, it will be understood that it is capable of extensive modifications and that I do not desire to be limited to the exact form shown and described, but only so much as may be necessitated by the state of the art.

What I claim, and desire to secure by Letters Patent of the United States, is—

1. In a machine of the class described, the combination of a supporting-frame, with mechanism for automatically and simultaneously reciprocating and rotating it to cause any point of it to move through an ellipse, comprising a stationary guideway, a carriage reciprocating longitudinally thereof, and the supporting-frame rotating on said carriage.

2. In a machine of the class described, the combination of a supporting-frame, with mechanism for automatically and simultaneously reciprocating and rotating it to cause any point of it to move through an ellipse, comprising a stationary guideway, a carriage reciprocating longitudinally thereof, and the supporting-frame rotating on said carriage, together with a rotating shaft mounted in said carriage and having an eccentric thereon, and a link connecting said eccentric and the frame of the stationary guideway.

3. In a machine of the class described, the combination of a supporting-frame, with mechanism for automatically reciprocating it, comprising a stationary guideway upon which the frame reciprocates, a rotating shaft mounted in said reciprocating frame and having an eccentric thereon, and a link connecting said eccentric and the framework of the stationary guideway.

4. In a machine of the class described, the combination of a supporting-frame, with mechanism for simultaneously and automatically reciprocating and rotating it so as to cause any point on it to move through an ellipse, said mechanism comprising a stationary guideway, a carriage reciprocating longitudinally thereof, means for reciprocating said carriage, a supporting-frame rotating on said carriage, a shaft rotating in said carriage and carrying a pinion, and a circular rack or gear on the supporting-frame meshing with said pinion.

5. In a machine of the class described, the combination of a supporting-frame, with mechanism for automatically moving it at intervals so as to cause any point on it to move through an ellipse.

6. In a machine of the class described, the combination of a supporting-frame, with mechanism for automatically and simultaneously reciprocating and rotating it to cause any point on it to move through an ellipse, said mechanism comprising a rotating shaft mounted in a reciprocating carriage upon which the supporting-frame rotates, connections operated by said shaft for reciprocating the carriage and rotating the supporting-frame therein, and a clutch operated automatically for throwing said rotating shaft into and out of operation to cause the mechanism to operate at intervals.

7. In a machine of the class described, the combination of a supporting-frame, with mechanism for automatically and simultaneously reciprocating and rotating it to cause any point on it to move through an ellipse, said mechanism comprising a stationary guideway, a carriage reciprocating longitudinally thereof, a supporting-frame rotating in said carriage, a rotating shaft mounted in said carriage and having an eccentric thereon, a link connecting said eccentric and the framework of the stationary guideway, and a clutch operated automatically for throwing said rotating shaft into and out of operation to cause the mechanism to operate at intervals.

8. In a machine of the class described, the combination of a supporting-frame, with mechanism for automatically and simultaneously reciprocating and rotating it to cause any point on it to move through an ellipse, said mechanism comprising a stationary guideway, a carriage reciprocating longitudinally thereof, a supporting-frame rotating in said carriage, a rotating shaft mounted in said carriage and having an eccentric thereon, a link connecting said eccentric and the framework of the stationary guideway, and a clutch for throwing said rotating shaft into and out of operation.

9. In a machine of the class described, the combination of a supporting-frame, with mechanism for automatically and simultaneously reciprocating and rotating it to cause any point on it to move through an ellipse, said mechanism comprising a stationary guideway, a carriage reciprocating longitudinally thereof, a supporting-frame rotating in said carriage, a rotating shaft mounted in said carriage and having an eccentric thereon, a link connecting said eccentric and the framework of the stationary guideway, a clutch controlling the operation of said shaft, and means for automatically shifting said clutch at intervals to control the movement of the supporting-frame.

10. In a machine of the class described, the combination of a rotating supporting-frame, with a forming-tool journaled adjacent to said frame, and gearing and connections for rotating said frame and simultaneously rotating said tool at a rate synchronous with the movement of the supporting-frame.

11. In a machine of the class described, the combination of a supporting-frame, with a forming-tool journaled adjacent to said frame and geared to rotate synchronously therewith, and means for automatically moving the frame so as to cause it to move through an ellipse relative to said tool.

12. In a machine of the class described, the combination of a supporting-frame, with a forming-tool geared to said frame to rotate therewith, and mechanism for automatically and simultaneously reciprocating and rotating said frame to cause it to move through an ellipse relative to said tool.

13. In a machine of the class described, the combination of a supporting-frame, with a forming-tool coöperating therewith by means of a gear-pinion on said tool meshing with a rack on said frame for rotating said tool, and mechanism for automatically moving the frame so as to cause its surface and the surface of said tool to move at the same rate of speed.

14. In a machine of the class described, the combination of a supporting-frame, with a forming-tool coöperating therewith, mechanism for automatically and simultaneously reciprocating and rotating said frame to cause it to move through an ellipse relative to said tool, and mechanism for rotating said tool at a rate of speed corresponding to the movement of the frame beneath it.

15. In a machine of the class described, the combination of a supporting-frame, with a forming-tool coöperating therewith, mechanism for automatically moving said frame so as to cause it to move through an ellipse relative to said tool, and means for rotating said tool in unison with the movement of the frame comprising an elliptical gear on the frame, and a coöperating pinion on the shaft of the tool.

16. In a machine of the class described, the combination of a supporting-frame, with a forming-tool coöperating therewith, means for raising and lowering said tool comprising a rotary cam coöperating with said tool, and mechanism for automatically moving said frame so as to cause it to move through an ellipse relative to said tool.

17. In a machine of the class described, the combination of a supporting-frame, with a forming-tool coöperating therewith, means for automatically raising and lowering said tool, and mechanism for automatically moving the frame so as to cause it to move through an ellipse relative to said tool.

18. In a machine of the class described, the combination of a supporting-frame, with a forming-tool coöperating therewith, means for automatically raising and lowering said tool at regular intervals, and mechanism for automatically moving the frame so as to cause it to move through an ellipse relative to said tool.

19. In a machine of the class described, the combination of a supporting-frame, with a forming-tool coöperating therewith, means for automatically raising and lowering said tool at regular intervals, and mechanism for automatically moving the frame at regular intervals so as to cause it to move through an ellipse relative to said tool, said means and mechanism being so timed that the tool is in its lower position and in contact with the frame during its movement.

20. In a machine of the class described, the combination of a supporting-frame, with a forming-tool coöperating therewith, means for automatically raising and lowering said tool at regular intervals, means for rotating said tool when it is in its lower position, and mechanism for automatically moving said frame so as to cause it to move through an ellipse relative to said tool.

21. In a machine of the class described, the combination of a supporting-frame, with a forming-tool coöperating therewith, mechanism for automatically moving said frame so as to cause it to move through an ellipse relative to said tool, and means for vibrating said tool to keep its axis at right angles to the line of movement of the portion of the frame passing beneath it.

22. In a machine of the class described, the combination of a supporting-frame, with a forming-tool coöperating therewith, mechanism for automatically moving said frame so as to cause it to move through an ellipse relative to said tool, and means for automatically vibrating said tool to keep its axis at right angles to the line of movement of the portion of the frame passing beneath it.

23. In a machine of the class described, the combination of a supporting-frame, with a forming-tool coöperating therewith, mechanism for automatically moving said frame at intervals so as to cause it to move through an ellipse relative to said tool, and means for vibrating said tool to keep its axis at right angles to the line of movement of the portion of the frame passing beneath it.

24. In a machine of the class described, the combination of a supporting-frame, with a forming-tool coöperating therewith, mechanism for automatically and simultaneously reciprocating and rotating said frame to cause it to move through an ellipse relative to said tool, and means for automatically vibrating said tool to keep its axis at right angles to the line of movement of the portion of the frame passing beneath it.

25. In a machine of the class described, the combination of a supporting-frame, with a forming-tool coöperating therewith, means for raising and lowering said tool, mechanism for automatically moving said frame so as to cause it to move through an ellipse relative to said tool, and means for vibrating said tool to keep the axis at right angles to the line of movement of the portion of the frame passing beneath it.

26. In a machine of the class described, the combination of a supporting-frame, with a forming-tool coöperating therewith, mechanism for automatically moving said frame so as to cause it to move through an ellipse relative to said tool, and means for adjusting the tool longitudinally to vary the size of the elliptical surface coöperating therewith.

27. In a machine of the class described, the combination of a supporting-frame, with a forming-tool coöperating therewith, mechanism for automatically moving said frame so as to cause it to move through an ellipse relative to said tool, and means for adjusting the tool angularly to vary the angle of the tool relative to the surface of the frame.

28. In a machine of the class described, the combination of a supporting-frame, with a forming-tool coöperating therewith, mechanism for automatically moving said frame so as to cause it to move through an ellipse relative to said tool, and means for adjusting said tool longitudinally and angularly for the purposes described.

29. In a machine of the class described, the combination of a supporting-frame, with a forming-tool coöperating therewith, mechanism for automatically moving said frame so as to cause it to move through an ellipse relative to said tool, and means for adjusting said tool longitudinally and vertically for the purposes described.

30. In a machine of the class described, the combination of a supporting-frame, with a forming-tool coöperating therewith, mechanism for automatically moving said frame so as to cause it to move through an ellipse relative to said tool, and means for adjusting the tool angularly and vertically for the purposes described.

31. In a machine of the class described, the combination of a supporting-frame, with a forming-tool coöperating therewith, mechanism for automatically moving said frame so as to cause it to move through an ellipse relative to said tool, and means for adjusting the tool angularly, longitudinally and vertically for the purposes described.

32. In a machine of the class described, the combination of a supporting-frame, with a forming-tool coöperating therewith, mechanism for automatically moving said frame so as to cause it to move through an ellipse relative to said tool, means for vibrating said tool to keep its axis at right angles to the line of movement of the portion of the frame passing beneath it, and means for regulating the amount of said vibration.

33. In a machine of the class described, the combination of a supporting-frame, with mechanism for automatically moving it so as to cause any point on it to move through an ellipse, and means for adjusting said mechanism so that the relative lengths of the major and minor axes of the ellipse may be varied as desired.

34. In a machine of the class described, the combination of a supporting-frame, with mechanism for automatically and simultaneously reciprocating and rotating it to cause any point on it to move through an ellipse, and means for adjusting said mechanism to vary the length of reciprocation so that the relative lengths of the major and minor axes of the ellipse may be varied as desired.

35. In a machine of the class described, the combination of a supporting-frame, with mechanism for automatically reciprocating it, comprising a stationary guideway upon which the frame reciprocates, a rotating shaft mounted in said reciprocating frame and having an adjustable eccentric thereon, and a link connecting said eccentric and the framework of the stationary guideway.

36. In a machine of the class described, the combination of a supporting-frame, with a forming-tool coöperating therewith, adjustable means for raising and lowering said tool, and mechanism for automatically moving said frame so as to cause it to move through an ellipse relative to said tool.

37. In a machine of the class described, the combination of a supporting-frame, with a forming-tool coöperating therewith, means for automatically raising and lowering said tool comprising a rotating cam and a coöperating bearing-surface adjustable vertically, and mechanism for automatically moving the frame so as to cause it to move through an ellipse relative to said tool.

38. In a machine of the class described, the combination of a supporting-frame, with a forming-tool coöperating therewith, means for automatically raising and lowering said tool comprising a rotating cam and a coöperating bearing-surface adjustable horizontally, and mechanism for automatically moving the frame so as to cause it to move through an ellipse relative to said tool.

39. In a machine of the class described, the combination of a movable supporting-frame, means for moving said frame through a curve, with a forming-tool journaled adjacent said frame, and gearing between said frame and tool whereby the movement of the former rotates the latter synchronously therewith.

40. In a machine of the class described, the combination of a movable supporting-frame, means for moving said frame through a curve, with a forming-tool journaled adjacent said frame, and a rack on said frame having the same curve as that through which the frame is moved, and a pinion on said forming-tool meshing with said rack whereby the movement of the frame rotates the tool synchronously therewith.

In witness whereof I hereunto set my hand this 11th day of February, 1899.

CHARLES E. SANDSTROM.

In presence of—
LOUISE SERAGE,
ALLAN A. MURRAY.